Oct. 28, 1969 E. O. GILBERT 3,475,689

ELECTRONIC INTEGRATION APPARATUS

Filed Oct. 26, 1966

INVENTOR
EDWARD O. GILBERT

BY Richard G. Stephens

ATTORNEY 3,475,689

ELECTRONIC INTEGRATION APPARATUS

Edward O. Gilbert, Ann Arbor, Mich., assignor to Applied Dynamics, Inc., Ann Arbor, Mich., a corporation of Michigan Filed Oct. 26, 1966, Ser. No. 589,747
Int. Cl. G06g 7/18
U.S. Cl. 328—127 6 Claims

ABSTRACT OF THE DISCLOSURE

An electronic Miller integrator including a DC amplifier and a computing capacitor wherein the effects of dielectric absorption in the computing capacitor are compensated for by means of a smaller feedback capacitor connected in a positive feedback circuit, with the capacity times absorption of the smaller capacitor approximating the capacity times absorption of the computing capacitor.

This invention relates to electronic integrators, and more particularly, to improved electronic integrator circuits having greater accuracy. This invention is, in some respects, an improvement to the invention shown in my copending application Ser. No. 392,489, now abandoned, filed jointly with Charles H. Single and assigned to the same assignee as the present invention, and in U.S. Patent No. 3,381,230 issued Apr. 30, 1968. In the analog computer, automatic control and instrumentation arts, integration commonly is accomplished by so-called "Miller" integrators, which comprise operational amplifiers having a feedback capacitor connected between the amplifier output and input terminals. The mentioned copending application discloses how the accuracies of such integrators may be markedly increased by elimination of various computing errors arising from finite amplifier gain, computing capacitor leakage, current input, capacitor absorption, capacitor voltage coefficient, and capacitor temperature coefficient. While the system disclosed therein for compensating for capacitor absorption operates very effectively, it requires a large number of capacitors and resistors, and consequently a considerable amount of adjustment, to compensate for absorption over a substantial frequency range. Briefly described, the prior system compensates for or cancels out the effect of absorption in the negative feedback path containing the integrator computing capacitor by providing a positive feedback path containing a network having the same transfer function as the absorption of the computing capacitor. As has been shown in the literature, proper simulation of such absorption over a substantial frequency range requires a network having a plurality of RC circuit branches. Because absorption is small, impractically large resistances are required in such networks, unless voltage dividers are also used in such networks.

The present invention allows one to eliminate the complex, many-component networks heretofore used for absorption compensation and in lieu thereof to use an extremely simple positive feedback impedance, often a single capacitor. Briefly described, the present invention contemplates provision of a positive feedback or regenerative feedback circuit containing a small capacitor having a much greater absorption-to-capacity ratio than the main computing capacitor. Ideally, the small capacitor absorption will exceed that of the main computing capacitor by the same factor by which the main capacitor capacitance exceeds that of the small capacitor. Because the capacitance of the small capacitor in the positive feedback circuit will have an effect on the integrating rate opposite to that of the main computing capacitor in the negative feedback circuit, the capacity of the main capacitor must be increased when compensation is added to preserve the same integrator time-constant, all of which will be explained below in greater detail.

Thus it is a principal object of the present invention to provide improved absorption compensation apparatus in an electronic integrator.

It is a more specific object of the invention to provide absorption compensation in an electronic integrator using many fewer components.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
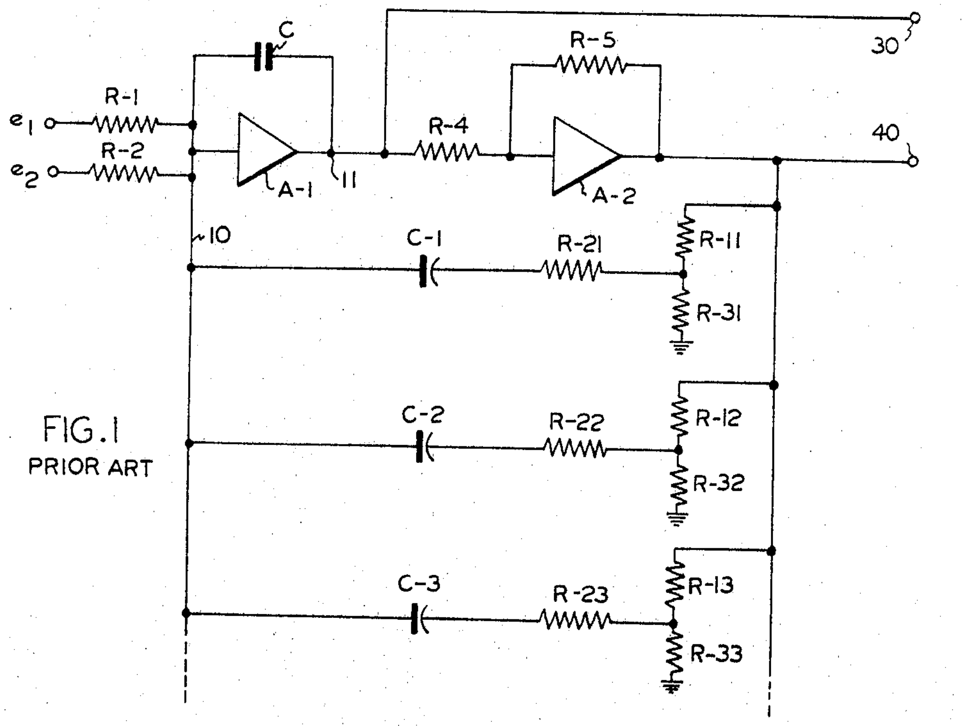
FIG. 1 is an electrical schematic diagram of a prior known scheme for capacitor absorption compensation.

FIG. 1 illustrates the principal form of compensation for capacitor absorption disclosed in the mentioned Gilbert-Single application. Input voltages $e_1$ and $e_2$ are connected to apply currents to summing junction 10 via scaling resistors R–1 and R–2. Amplifier A–1 comprises a conventional DC-coupled high-gain operational amplifier, and main computing capacitor C is connected between output and input terminals 11 and 10, respectively, of amplifier A–1 to provide a conventional Miller integrator. Amplifier A–1 is an inverting type. In accordance with the prior Gilbert-Single invention, a unity-gain, inverting further amplifier A–2 is provided to invert the output from amplifier A–1, and the output from amplifier A–2 on terminal 40 is connected, by way of a special impedance network, back to summing junction 10. In FIG. 1 the special impedance network is shown as including three branches, having three voltage dividers each having two resistors, three series resistances, and three capacitors, and the dashed lines at the bottom of FIG. 1 indicate that additional further branches frequently should be or must be connected to terminals 10 and 40 in parallel with those shown. The total number of such branches required with the previous device depends upon the width of the frequency range over which one wishes to compensate for capacitor absorption. Three to five such branches are required for typical applications. As is evident from FIG. 1, four components per branch are required, so that a five-branch compensating circuit requires twenty components in the capacitor absorption network. The Gilbert-Single application also discloses how further components may be utilized in such networks to compensate for finite gain in amplifier A–1, leakage in capacitor C, and variations in capacity of capacitor C with temperature and applied voltage. Irrespective of such other types of error compensation, it will be seen that provision, connection and adjustment of the absorption compensation network of the type shown in FIG. 1 may be expensive. Utilizing the present invention, the number of components required for effective compensation for main computing capacitor absorption may be drastically reduced. Thus, it is a primary object of the present invention to provide an improved electronic integrator having an improved capacitor absorption correction circuit.

Figure 2:
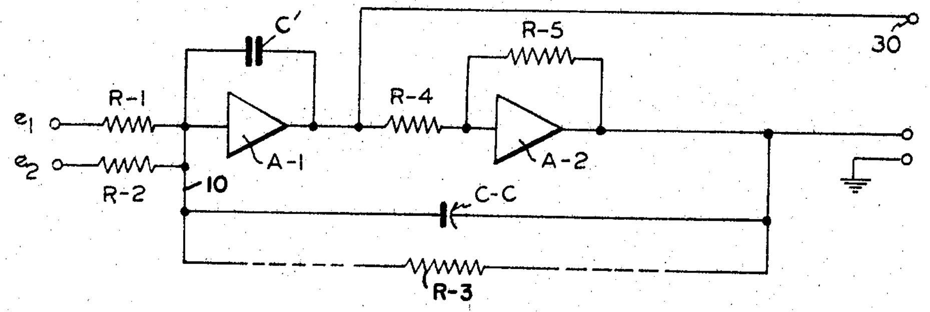
FIG. 2 is an electrical schematic diagram of one form of absorption compensation circuit constructed in accordance with the present invention.
Figure 3:
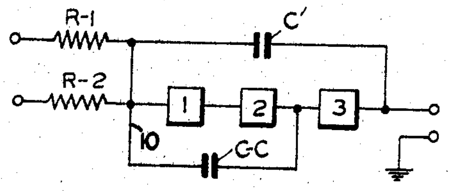
FIGS. 3 and 4 are electrical schematic diagrams showing alternative forms of the invention.
Figure 4:
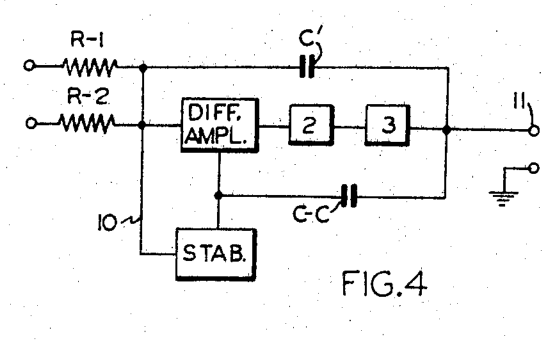

In the forms of the invention shown in FIGS. 2–4, parts which generally correspond in structure and function to counterparts in FIG. 1 have been given identical reference characters. Comparing FIGS. 1 and 2, it will be seen that the multibranch feedback network (shown in FIG. 1 as including 12 components) has been replaced in FIG. 2 by a single capacitor C—C. In accordance with the present invention, compensating capacitor C—C, though having a much smaller capacitance than computing capacitor C, has much greater absorption than main capacitor C. In a typical example, main computing capacitor C might have a capacitance of about 1.0 microfarad and C—C be only .02 microfarad, or one-fiftieth as large. However, capacitor C—C is selected to have, in such a case, approximately fifty times as much absorption as capacitor C. Thus, in the example, the capacity per unit absorption current of the main computing capacitor is (50×50) or 2500 times that of compensating capacitor C—C. Designating the capacities and dielectric absorptions of the main capacitor and the compensating capacitor as $C_1$, $A_1$, $C_2$ and $A_2$, respectively, the ideal relationship may be expressed by any one of the following equations:

$$C_1A_1=C_2A_2 \quad (1)$$

$$\frac{C_1}{A_2}=\frac{C_2}{A_1} \quad (2)$$

$$\frac{C_1}{A_1}=\left(\frac{C_1}{C_3}\right)^2\cdot\frac{C_2}{A_2} \quad (3)$$

The dielectric material of high-quality computing capacitors is frequently polystyrene or Teflon. Inexpensive paper dielectric capacitors generally have high absorption. An apparent advantage of the invention is that capacitors having high absorption can be made readily with low-quality dielectric materials, so that the compensating capacitors required in practice of the present invention are inexpensive and readily available.

It is not necessary that the absorption of capacitor C—C be greater than that of capacitor C by *exactly* the same factor by which the capacity of C exceeds that of C—C.

It is important to note that insertion of compensating capacitor C—C operates to reduce the integration time-constant. For example, placing the .02 capacitor referred to above in the positive feedback circuit, with the main capacitor of 1.0 microfarad connected in negative feedback relationship, provides an effective or overall integrator capacity of $C-C_c$, or 1.0—.02, or 0.98 microfarad. Accordingly, in such an arrangement, if an effective integrator capacity of 1.0 mfd. is desired, the main capacitor should be given a larger capacity (such as 1.02 mfd., for example).

It is generally desirable, of course, that the dissipation vs. frequency characteristics of capacitors C and C—C have similar shapes, to provide uniform compensation over the frequency range of interest. Where the dissipation vs. frequency characteristics of two capacitors cannot be sufficiently matched, it is within the scope of the present invention to utilize a single compensating capacitor like C—C of FIG. 2 for compensation over one frequency range, but to utilize one or more network branches of the type shown in FIG. 1 for compensation over a different frequency band.

It is not always necessary that an extra multistage amplifier be provided in order to effect absorption compensation in accordance with the invention. Amplifiers A–1 and A–2 in FIGS. 1 and 2 each typically comprises three cascaded inverting stages. In FIGS. 3 and 4 only a single multistage amplifier is shown in each instance with three cascaded stages. In FIG. 3 compensating capacitor C—C is shown connected between the output of the second stage and the summing junction 10. In FIG. 4 compensating capacitor C—C is shown connected between output terminal 11 and the stabilizer input terminal of a differential amplifier, which connection also provides positive feedback. A conventional modulator-AC-coupled amplifier-demodulator low frequency stabilizer channel is shown at STAB in FIG. 4 connected between summing junction 10 and the differential amplifier. It will be recognized in FIG. 3 that the gain in the positive feedback compensating loop includes only that of stages 1 and 2.

In FIGS. 3 and 4, the effect of compensating capacitor C—C on the overall integrating time-constant is to reduce it as in FIG. 2, and the value of capacitor C′ must be adjusted accordingly.

In any form of the invention, a resistive positive feedback path may be provided in parallel with the compensating capacitor path in order to prevent errors which otherwise might occur due to computing capacitor leakage and finite amplifier gain. Resistance R–3 shown in dotted lines in FIG. 2 represents such a resistance. A voltage divider could be used, of course, as in FIG. 1, to allow use of a smaller resistance. The current input and voltage offset adjustments shown in the Gilbert-Single application also may be used with the present invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

What is claimed is:

1. An electronic integrator circuit with dielectric absorption effects compensation, comprising, in combination: an electronic amplifier having an input terminal; an output terminal; a plurality of amplifier stages collectively providing polarity inversion between said terminals; a first capacitor having a capacity and dielectric absorption connected between said terminals, whereby said plurality of amplifier stages and said first capacitor comprise a closed loop circuit; and a positive feedback circuit including a second capacitor having capacity and dielectric absorption connected to apply positive feedback to said closed loop circuit, the capacity of said first capacitor being greater than the capacity of said second capacitor and the dielectric absorption of said first capacitor being less than the dielectric absorption of said second capacitor.

2. A circuit according to claim 1 in which said positive feedback circuit includes a further inverting amplifier means connected to said output terminal and in which said second capacitor is connected between said further amplifier means and said input terminal.

3. A circuit according to claim 1 in which said positive feedback circuit extends between the output circuit of one of said stages and said input terminal.

4. A circuit according to claim 1 in which said positive feedback circuit extends between said output terminal and one of said amplifier stages, said one of said amplifier stages comprises a differential amplifier.

5. Apparatus according to claim 1 in which said positive feedback circuit includes a further impedance network connected in parallel with said second capacitor.

6. A circuit according to claim 1 in which the capacity of said first capacitor times the dielectric absorption of said first capacitor is substantially equal to the capacity of said second capacitor times the dielectric absorption of said second capacitor.

References Cited

UNITED STATES PATENTS 3,047,808 7/1962 Gray ---------- 235—183 XR

JOHN S. HEYMAN, Primary Examiner

JOHN ZAZWORSKY, Assistant Examiner

U.S. Cl. X.R.

235—183; 307—230; 328—162